(12) United States Patent
Lin et al.

(10) Patent No.: US 10,754,147 B2
(45) Date of Patent: *Aug. 25, 2020

(54) PROJECTOR AND THREE-DIMENSIONAL PRINTING APPARATUS WITH IMAGE DISPLACEMENT MODULE

(71) Applicant: Young Optics Inc., Hsinchu (TW)

(72) Inventors: Wei-Szu Lin, Hsinchu (TW);
Chao-Shun Chen, Hsinchu (TW);
Chia-Chen Liao, Hsinchu (TW);
Yu-Chen Chang, Hsinchu (TW);
Chien-Hsing Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,619

(22) Filed: May 6, 2019

(65) Prior Publication Data
US 2019/0258048 A1    Aug. 22, 2019

Related U.S. Application Data

(63) Continuation of application No. 15/088,144, filed on Apr. 1, 2016, now Pat. No. 10,281,715.

(30) Foreign Application Priority Data

Jun. 16, 2015   (TW) .............................. 104119521 A
Dec. 4, 2015    (TW) .............................. 104140907 A

(51) Int. Cl.
*G03B 27/42*     (2006.01)
*G02B 26/08*     (2006.01)

(52) U.S. Cl.
CPC ....... *G02B 26/085* (2013.01); *G02B 26/0833* (2013.01)

(58) Field of Classification Search
CPC .............. G02B 26/0833; G02B 26/101; G02B 26/085; G02B 26/105; G02B 26/0841;
(Continued)

(56) References Cited

U.S. PATENT DOCUMENTS

2014/0322374 A1    10/2014   El-Siblani et al.

FOREIGN PATENT DOCUMENTS

CN    1713028    12/2005
CN    1797176    7/2006
(Continued)

OTHER PUBLICATIONS

"Office Action of China Counterpart Application," dated Sep. 18, 2019, p. 1-10.
(Continued)

*Primary Examiner* — Mesfin T Asfaw
(74) *Attorney, Agent, or Firm* — JCIPRNET

(57) ABSTRACT

A projector including a light source, a light valve, a projection lens and a displacement module is provided. The light source generates an illumination light. The light valve converts the illumination light into a multi-pixel area image light. The projection lens is disposed in a transmission path of the multi-pixel area image light. The image displacement module includes a carrier, an optical element, a frame and a base. The carrier, the frame and the base are substantially coplanar with each other, and the multi-pixel area image light provided is configured to be moved by the optical element and being moved along a third direction in response to the spinning of the carrier, and the first direction is different from the second direction. Furthermore, a three-dimensional printing apparatus is also provided.

20 Claims, 17 Drawing Sheets

(58) Field of Classification Search
CPC .. G02B 7/1821; G02B 27/0172; G02B 26/10; G02B 5/09; G02B 17/08; G02B 21/0048; G02B 26/08; G02B 6/3518; G02B 1/04; G02B 1/12; B81B 3/00; B81B 2203/0118; B81B 2201/047; B81B 2203/0154; G03B 21/008; G03B 21/142; G03B 21/28

See application file for complete search history.

(56) References Cited

FOREIGN PATENT DOCUMENTS

| | | |
|---|---|---|
| CN | 201066401 | 5/2008 |
| CN | 100399103 | 7/2008 |
| JP | 2013242455 | 12/2013 |
| TW | 200634334 | 10/2006 |
| TW | 200712732 | 4/2007 |
| TW | M327045 | 2/2008 |
| TW | 201044095 | 12/2010 |
| TW | 201228808 | 7/2012 |
| TW | M492012 | 12/2014 |

OTHER PUBLICATIONS

"Office Action of Taiwan Counterpart Application", dated Feb. 13, 2020, pp. 1-4.

PROJECTOR AND THREE-DIMENSIONAL PRINTING APPARATUS WITH IMAGE DISPLACEMENT MODULE

CROSS-REFERENCE TO RELATED APPLICATION

This application is a continuation application of and claims the priority benefit of U.S. application Ser. No. 15/088,144, filed on Apr. 1, 2016, now allowed, which claims the priority benefits of Taiwan application serial no. 104119521, filed on Jun. 16, 2015 and Taiwan application serial no. 104140907, filed on Dec. 4, 2015. The entirety of each of the above-mentioned patent applications is hereby incorporated by reference herein and made a part of this specification.

BACKGROUND OF THE INVENTION

Field of the Invention

The invention relates to a projector and a three-dimensional printing apparatus respectively with an image displacement module.

Description of Related Art

Most rear projection display products generate and project an image onto a screen via an optical engine. In order to increase the image resolution of the image projected on the screen by the optical engine, the optical engine needs a display element having higher resolution. Moreover, existing ultra-high-definition resolution liquid crystal displays can already provide image resolutions in the two specifications of 3840×2160 and 4096×2160. In contrast, the resolution provided by existing full HD rear projection display products no longer meets the market demand, and therefore rear projection display products need higher resolution to meet market demand. However, since the costs of higher resolution display elements are greater, under cost considerations, how to achieve high-resolution image screen effect via a light valve having low resolution pixels to increase production yield and reduce costs of the display apparatus is an issue to be solved.

SUMMARY OF THE INVENTION

One aspect of the invention is to provide a projector and a three-dimensional printing apparatus respectively with an image displacement module capable of providing relatively high resolution.

An image displacement module of an embodiment of the invention is adapted for an optical apparatus to switch the imaging positions of a plurality of plane image. The image displacement module includes a carrier and a base. An optical element is disposed at the carrier and capable of transmitting a multi-pixel area image light. A frame is connected to the carrier with a first connection part in a first direction. The base is connected to the frame with a second connection part in a second direction. The carrier could spin around a first axis with the first connection part and spin around a second axis with the second part. The transmitted multi-pixel area image light could be moved by the optical element and be moved along a third direction in response to the spinning of the carrier. The first direction is different from the second direction. In an embodiment of the invention, a base with actuators is adapted to control a rotating of the carrier to spin back and forth within an angle, such that the imaging positions of a plane image on the horizontal direction are moved by a first distance and the imaging positions of the plane image on the vertical direction are moved by a second distance. Therefore, the optical apparatus of an embodiment of the invention can be configured to project an image having relatively high resolution with a reflective light valve having relatively low resolution.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The foregoing and other technical contents, features, and efficacies of the invention are intended to be described more comprehensively in the plurality of embodiments below accompanied with figures. In the following embodiments, wordings used to indicate direction, such as "up," "down," "front," "back," "left," and "right", merely refer to directions in the accompanying drawings. Therefore, the directional wordings are used to illustrate rather than limit the invention.

Figure 1:
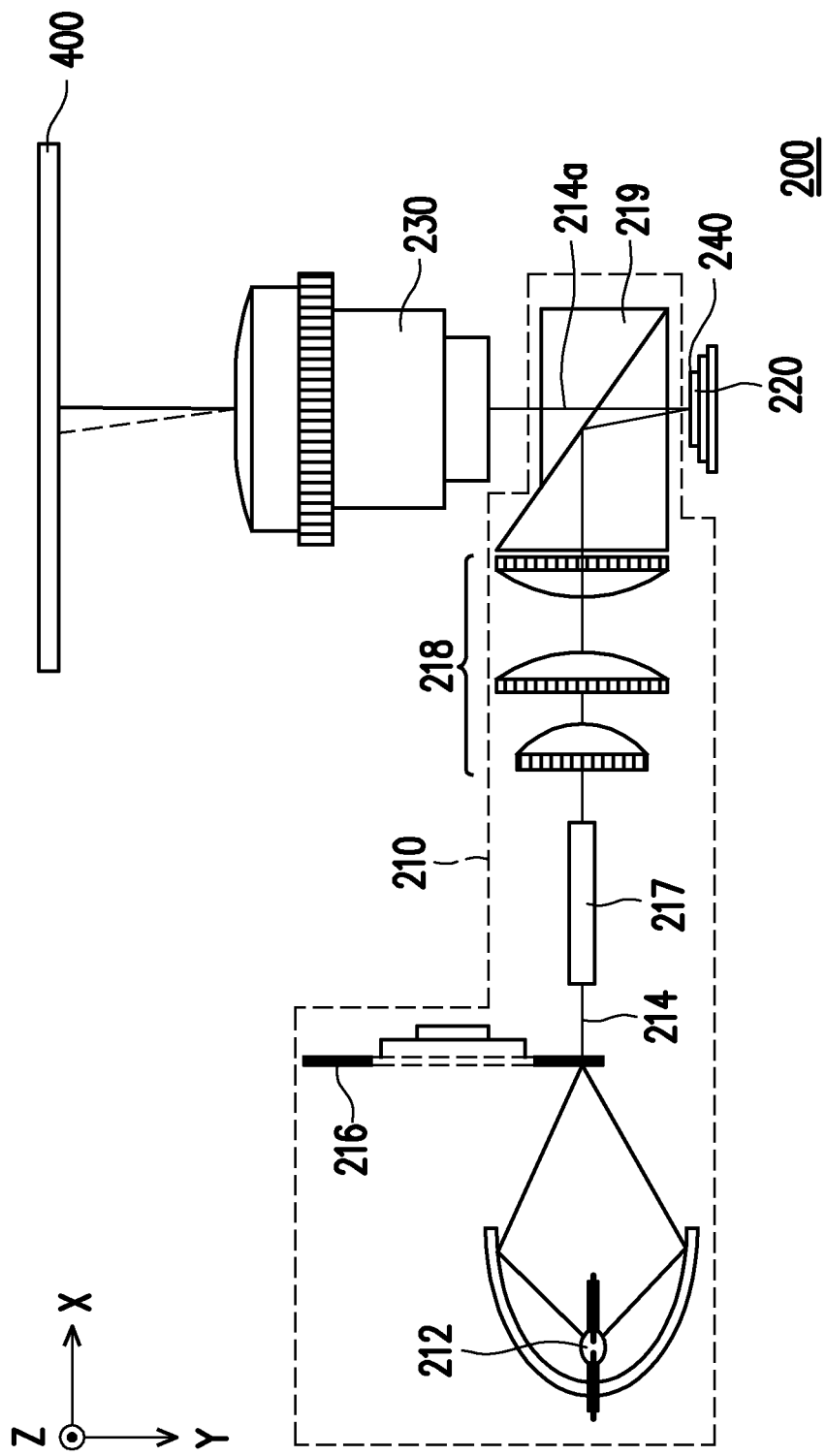
FIG. 1 is a structural schematic of an optical apparatus.

FIG. 1 illustrates a structural schematic of an optical apparatus. Referring to FIG. 1, an optical apparatus 200 includes an illumination system 210, a light valve 220, a projection lens 230, an image displacement module 240, and a screen 400. The illumination system 210 has a light source 212 adapted to provide a beam 214, and the light valve 220 is disposed on the transmission path of the beam 214 to convert the beam 214 into a plane image 214a. The projection lens 230 and the image displacement module 240 are disposed on the transmission path of the plane image 214a, and the light valve 220 is located between the illumination system 210 and the projection lens 230. The illumination system 210 is, for instance, a telecentric illumination system or a non-telecentric illumination system. The light valve 220 is, for instance, a digital micromirror device (DMD), LCD or LCoS (Liquid Crystal on Silicon), and the present embodiment is exemplified by a digital micromirror device ("DMD"). The light valve 220 is not limited to a reflective light valve, and may be a transmissive light valve in another embodiment. The light valve 220 outputs the plane image of multiple pixelized light or area image light, which is different with the image light provided by the laser-scanning device (htttps://en.wikipedia.org/wiki/Laser_scanning). The area image light contains multiple pixels in two directions.

When the plane image 214a (area image light) goes through the image displacement module 240, which changes the transmission path of the plane image 214a. In other words, the plane image 214a is projected on a first position on the screen 400, and the plane image 214a is projected on a second position on the screen 400 within another time, wherein the first position and the second position are separated by a fixed distance on the horizontal direction (x-axis) and/or the vertical direction (z-axis). Therefore the horizontal and the vertical resolutions of the plane image can be increased.

The beam 214) provided by the light source 212 is an illumination light. The beam 214 passes through a color wheel 216, a light integration rod 217, a lens group 218, and a total internal reflection (TIR) prism 219 in order, and the prism 219 reflects the beam 214 to the light valve 220. Then the light valve 220 converts the beam 214 into the plane image 214a of multiple pixelized light (light with multiple pixels) or area image light, which goes through the image displacement module 240 and the prism 219 in order or goes through the prism 219 and the image displacement module 240 in order, then the plane image 214a is projected on the screen 400 via the projection lens 230. The plane image 214a includes at least N pixels along the horizontal direction (x-axis) and at least N pixels along the vertical direction (z-axis) respectively, wherein N>100 is preferable. It should be mentioned that, if LEDs having different colors are used as the light source 212, then the color wheel 216 is not needed. Moreover, a lens array can also replace the light integration rod 217 to perform light homogenization.

Figure 2:
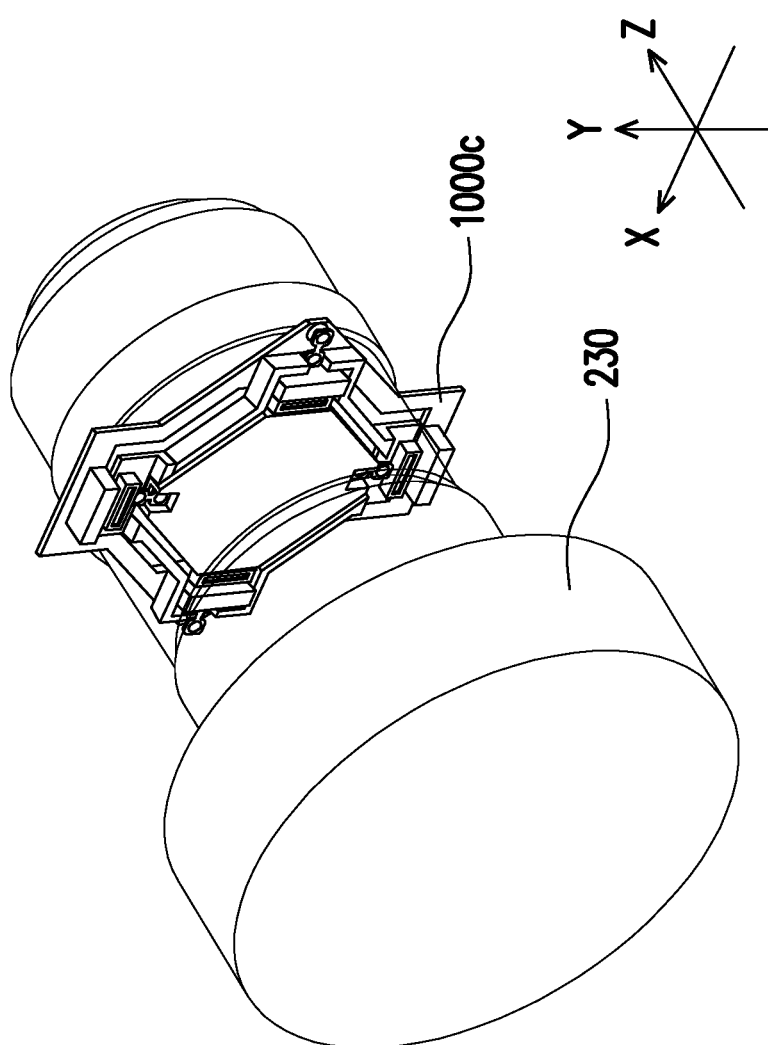
FIG. 2 illustrates a stereoscopic schematic of an image displacement module of an embodiment of the invention.

FIG. 2 illustrates a stereoscopic schematic of an image displacement module 1000c of an embodiment of the invention applied on the inside of a projection lens 230, but the image displacement module 1000c can also be placed outside of the projection lens 230, such that the projected image resolution is larger than the image resolution of the light valve.

Figure 3:
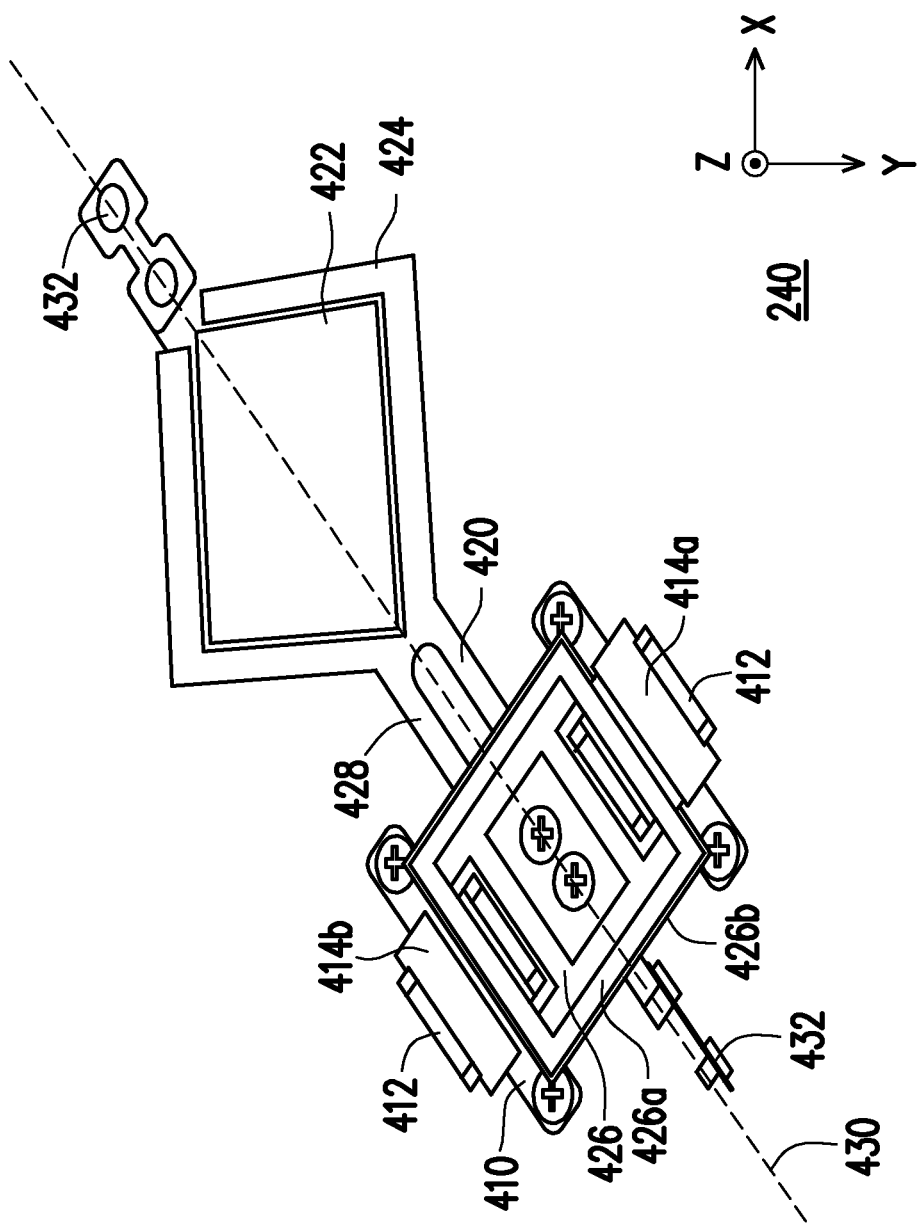
FIGS. 3, 4, 5, 6, and 7 respectively illustrate structural schematics of image displacement modules of different embodiments of the invention.

Referring to FIG. 3, the image displacement module 240 includes a base 410 and a carrier 420. The carrier 420 is connected to the base 410. Preferably, the carrier 420 is pivoted on the base 410, which controls the carrier 420 to spin (or vibrate) back and forth within a finite angle θ (not shown), which is not larger than 10 degrees. In another embodiment, the finite angle θ is smaller than 5 degrees. The carrier 420 has an optical element 422, which receives the plane image 214a (as shown in FIG. 1). When the carrier 420 vibrates back and forth, the optical element 422 can move respectively the positions of the plane image 214a on the horizontal direction (x-axis) and/or the vertical direction (z-axis) by a distance at the same time.

The base 410 includes, for instance, a magnetic material base 412, two magnets 414a and 414b, and a sensor module (not shown). The carrier 420 includes, for instance, an optical element 422, an optical element base 424, a coil module 426, and a rotational axis 428. The upper and lower ends of the rotational axis 428 are fixed via holes 432. In an embodiment of the invention, the sensor module includes, for instance, a circuit board (not shown) and a sensor (not shown). The sensor is configured to sense the oscillation amplitude of the rotational axis 428 of the carrier 420, and when the rotational axis 428 oscillates a certain amplitude toward the magnet 414a, the circuit board changes the magnetic properties of the coil module 426, such that a repulsion force is generated between the coil module 426 and the magnet 414a (attraction force is generated between the coil module 426 and the magnet 414b), such that the coil module 426 is far away from the magnet 414a. When the rotational axis 428 oscillates a certain amplitude toward the magnet 414b, the circuit board changes the magnetic properties of the coil module 426, such that a repulsion force is generated between the coil module 426 and the magnet 414b (attraction force is generated between the coil module 426 and the magnet 414a), such that the coil module 426 is far away from the magnet 414b. By keeping the coil module 426 close to/far from or far from/close to the magnets 414a/414b, the carrier 420 can vibrate back and forth, such that the imaging positions of the plane image 214a are changed. It should be noted that the carrier 420 rotating relative to the rotational axis 428 is driven by the coil module 426 and the magnets 414a/414b that locate on the same plane in the present embodiment.

The coil module 426 includes, for instance, a coil base 426a and a coil 426b, and the coil 426b surrounds the coil base 426a. In this embodiment, the rotational axis 428 and the optical element 422 can be integrally molded via an injection mold process. In another embodiment, the rotational axis 428 and the optical element 422 can also be separately manufactured, and then the optical element 422 and the rotational axis 428 are assembled together. Moreover, the optical element 420 includes a reflecting mirror and/or a lens. The optical element is not limited to include a single lens, and may also include a plurality of transmissive lenses to form a lens group.

Figure 4:
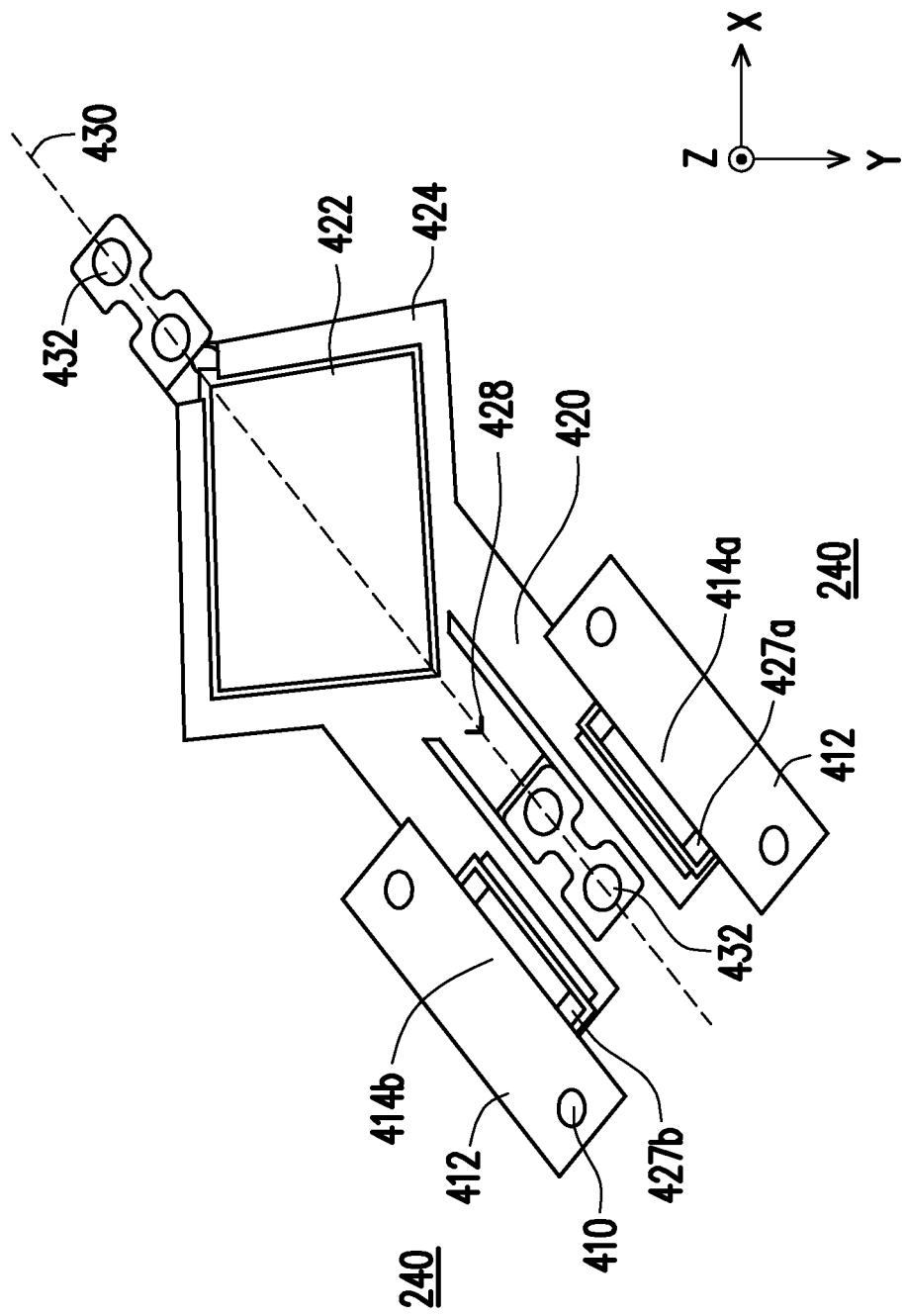

FIG. 4 illustrates a stereoscopic structural schematic of an image displacement module of another embodiment of the invention. The main difference between the present embodiment and the embodiments of FIG. 3 is, the upper and lower ends of the rotational axis 428 in FIG. 3 are respectively horizontally and vertically disposed, and in the present embodiment, the upper and lower ends of the rotational axis 428 are horizontally disposed. Moreover, in the present embodiment, the coil module is divided into two portions 427a and 427b. By keeping the coil modules 427a and 427b close to/far from or far from/close to the magnetic materials 414a/414b, the carrier 420 can vibrate back and forth, such that the imaging positions of the plane image 214a are changed.

Figure 5:
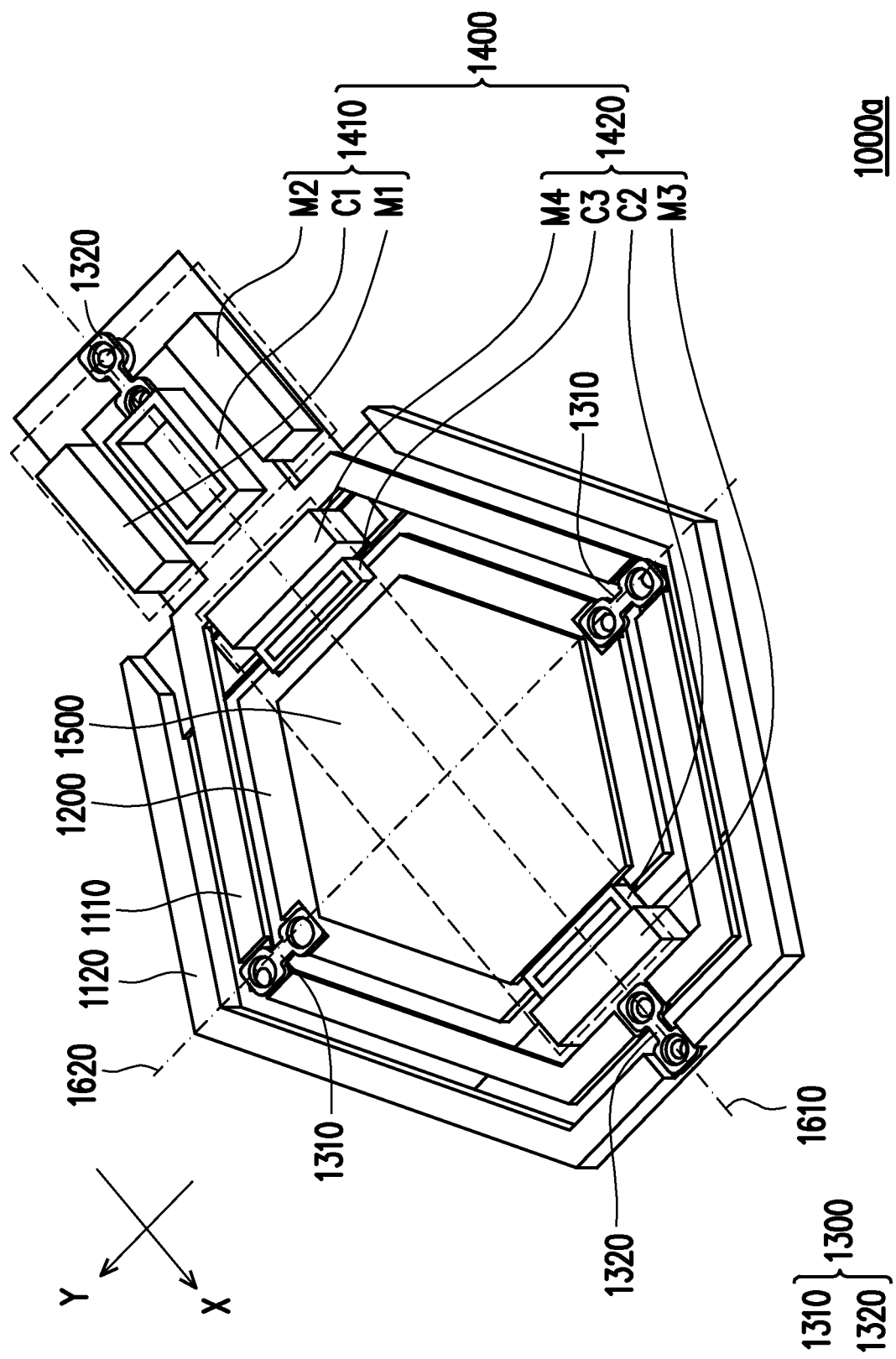

Referring to FIG. 5, an image displacement module 1000a includes a frame 1110, a base 1120 and a carrier 1200. The carrier 1200 rotates relative to two axes of a reference plane S. In this embodiment, the two axes of the reference plane S are, for instance, a first axis 1610 on a first direction X and a second axis 1620 on a second direction Y. The angle between the first axis 1610 and the second axis 1620 is 90 degrees, and the first axis 1610 and the second axis 1620 define the reference plane S. The frame 1110, the base 1120 and the carrier 1200 are symmetric relative to the first axis 1610. The carrier 1200 rotating relative to the first axis 1610 is driven by the coil C1 and the magnets M1 and M2 that locate on the same plane, and the carrier 1200 rotating relative to the second axis 1620 is driven by the coils C2 and C3 and the magnets M3 and M4 that locate on the same plane in this embodiment.

Moreover, the image displacement module 1000a further includes an optical element 1500, which is disposed on the carrier 1200. The optical element receives a plane image 214a from the light valve 220 (as shown in the FIG. 1). The plane image 214a includes at least N pixels along the horizontal direction and at least N pixels along the vertical direction respectively, N>100. The optical element includes a reflecting mirror and/or a lens. The optical element is not limited to include a single lens, and may also include a plurality of transmissive lenses to form a lens group.

In this embodiment, the at least one elastic member 1300 includes a first elastic pair 1310 (a first connection part) and a second elastic pair 1320 (a second connection part). The frame 1110 is connected to the base 1120, which surrounds the frame 1110. The frame 1110 is connected to the carrier 1200 via the first elastic pair 1310 and the base 1120 is connected to the frame 1110 via the second elastic pair 1320. Moreover, in the present embodiment, the rotation of the carrier 1200 or the frame 1110 is not necessary to exceed 180 degrees. The rotation in an angle within 10 degrees will be acceptable. The first elastic pair 1310 is disposed at two opposite sides of the frame 1110 along the second axis 1620, and the second elastic pair 1320 is disposed at two opposite sides of the base 1120 along the first axis 1610. In this embodiment, the at least one elastic member 1300 is a spring, but the at least one elastic member 1300 can also be other elastic deformable objects such as a metal part, sheet metal, a torsion spring, a plate or plastic, and the invention is not limited thereto.

The image displacement module 1000a further includes a plurality of actuators 1400, which are disposed on at least one of the frame 1110, the base 1120 and the carrier 1200. A first actuator 1410 arranged along the second direction Y and a second actuator 1420 arranged along the second direction X. The carrier 1200 rotates around the first axis 1610 via the first actuator 1410 and rotates around the second axis 1620 via the second actuator 1420.

In this embodiment, the first actuator 1410 includes two magnets M1 and M2 and one coil C1. M1 and M2 are disposed on the base 1120 in a manner in which M1 and M2 are symmetric to the first axis 1610. C1 is disposed on the first axis 1610 and is disposed between M1 and M2. The second actuator 1420 includes two magnets M3 and M4 and two coils C2 and C3. M3 and M4 are disposed on the base 1120 in a manner in which M3 and M4 are symmetric to the second axis 1620. C2 and C3 are disposed on the carrier 1200 in a manner in which C2 and C3 are symmetric to the second axis 1620 and are located between the M3 and M4. M3, M4, C2 and C3 are arranged along the first direction X. It should be mentioned that, the total length of coils used by the image displacement module 1000a of this embodiment is smallest, and the rotational inertia thereof is smallest.

A sensor module (not shown) controls the carrier 1200 to rotate relative to the two axes of the reference plane S by changing the magnetic properties of C1, C2, and C3. The sensor module (not shown) includes a circuit board and a sensor. The sensor is configured to sense the oscillation amplitude of the first axis 1610 and the second axis 1620. When the first axis 1610 or the second axis 1620 oscillates to a certain amplitude, the circuit board changes the magnetic properties of C1, C2, and C3 by changing the current direction on C1, C2, and C3. Therefore, a repulsion force or an attraction force is generated between C1, C2, and C3 and M1, M2, M3, and M4, such that C1, C2, and C3 are far away from or close to M1, M2, M3, and M4, and the carrier 1200 is thereby controlled to rotate relative to the two axes of the reference plane S. It should be noted that the carrier 1200 rotating relative to the first axis 1610 is driven by C1, M1 and M2, and the carrier 1200 rotating relative to the second axis 1620 is driven by C2, C3, M3 and M4 in the present embodiment. C1, C2 and C3 are separate, individually controlled, and operated independently. In other embodiments, the same actuation effect in this embodiment can also be achieved via piezoelectric materials or stepper motors, and the invention is not limited thereto.

The following embodiments use the reference numerals of the embodiments above and a portion of the contents thereof, wherein the same numerals are used to represent the same or similar elements and descriptions of the same technical contents are omitted. The omitted portions are as described in the embodiments above, and are not repeated in the embodiments below.

Figure 6:
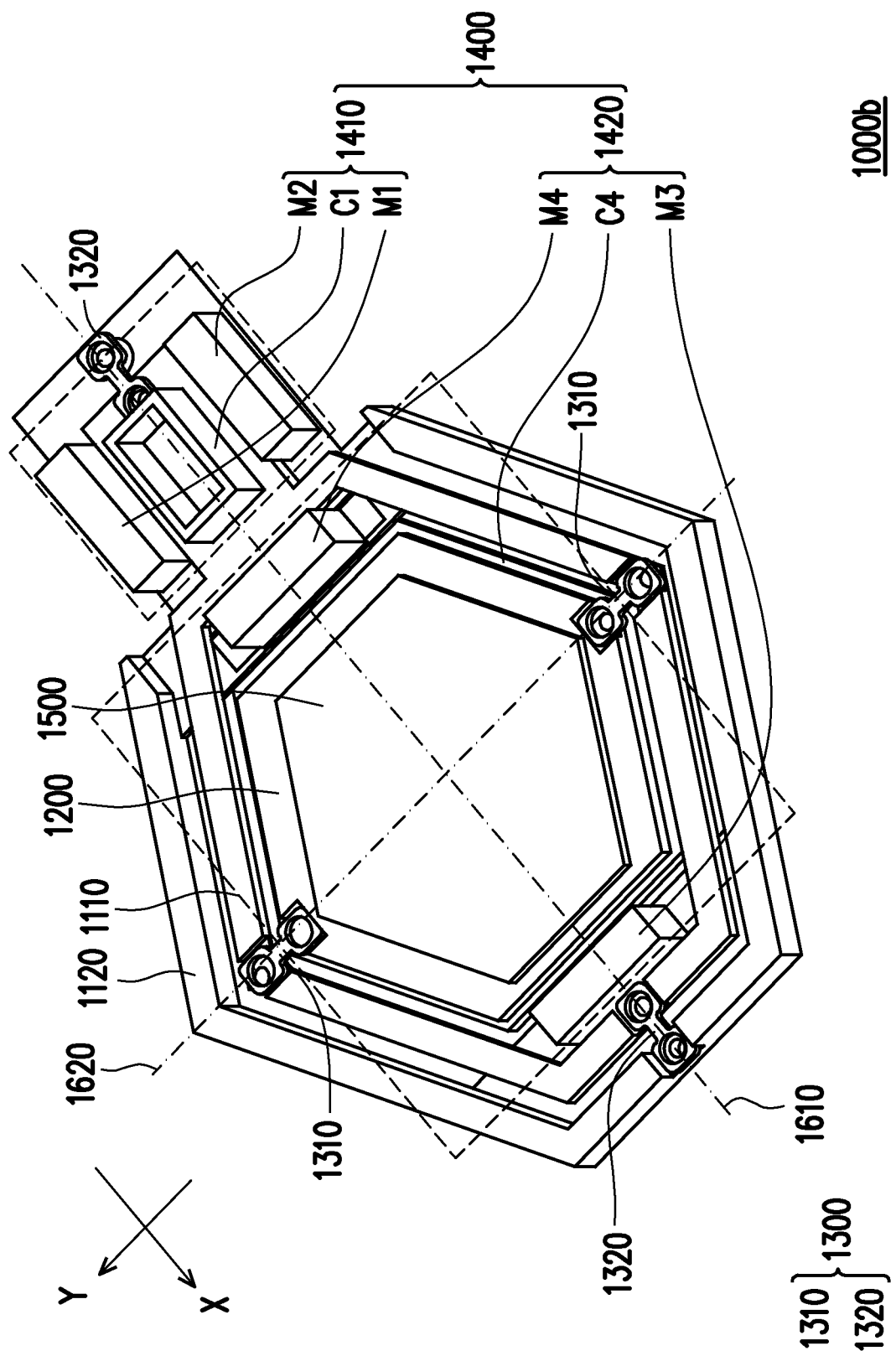

FIG. 6 illustrates a stereoscopic structural schematic of an image displacement module of another embodiment of the invention. The main difference between an image displacement module 1000b and the image displacement module 1000a is: a coil C4 surrounds the carrier 1200. It should be mentioned that, the two coils are used, therefore the manufacture is relatively simpler.

Figure 7:
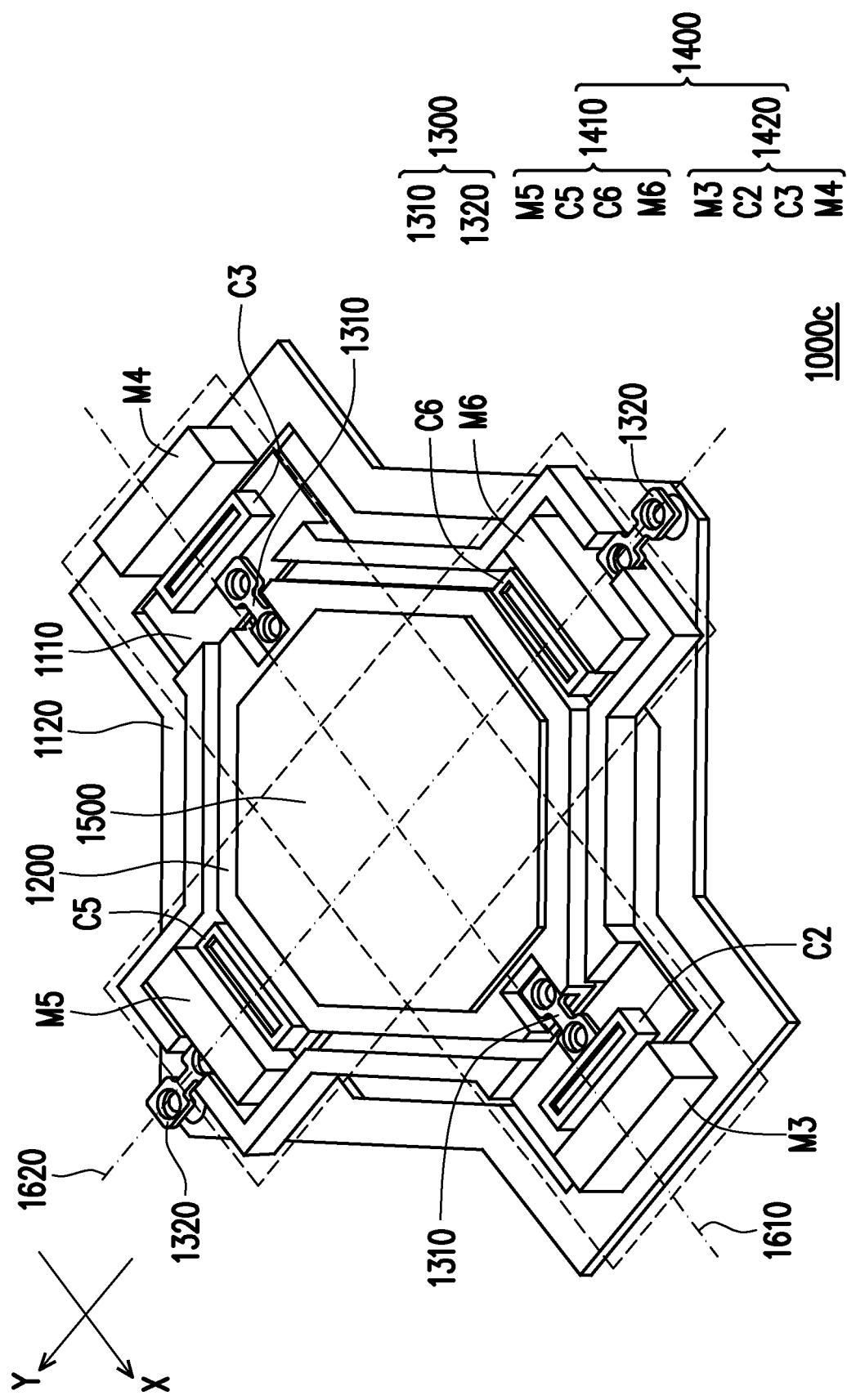

FIG. 7 illustrates a stereoscopic structural schematic of an image displacement module of another embodiment of the invention. In addition to being symmetric relative to the first axis 1610, the base 1120, the frame 1110 and the carrier 1200 are also symmetric relative to the second axis 1620. The first pair of elastic members 1310 are disposed at two opposite sides of the frame 1110 along the first axis 1610, and the second pair of elastic members 1320 are disposed at two opposite sides of the base 1120 along the second axis 1620. The first actuator 1410 includes two magnets M5 and M6 and two coils C5 and C6. M5 and M6 are both symmetric to the first axis 1610 and C5 and C6 are both symmetric to the first axis 1610. M5, M6, C5 and C6 are arranged along the second direction. Since the first actuator 1410 and the second actuator 1420 of the image displacement module 1000c have high symmetry, and the motors can be set to provide the same output, and therefore the control is easier. The first actuator 1410 provides a first signal (not shown) to control the spin of the first connection part and the second actuator 1420 provides a second signal (not shown) to control the spin of the second connection part. The first signal and the second signal go through different paths.

Moreover, the first actuator 1410 and the second actuator 1420 have longer arms of force in comparison to the previous embodiments, and therefore the power needed to start the image displacement module 1000c is relatively smaller. Since the distance between the four magnets or the four coils is greater, in comparison to previous embodiments, interference between them occurs less readily.

Figure 8A:
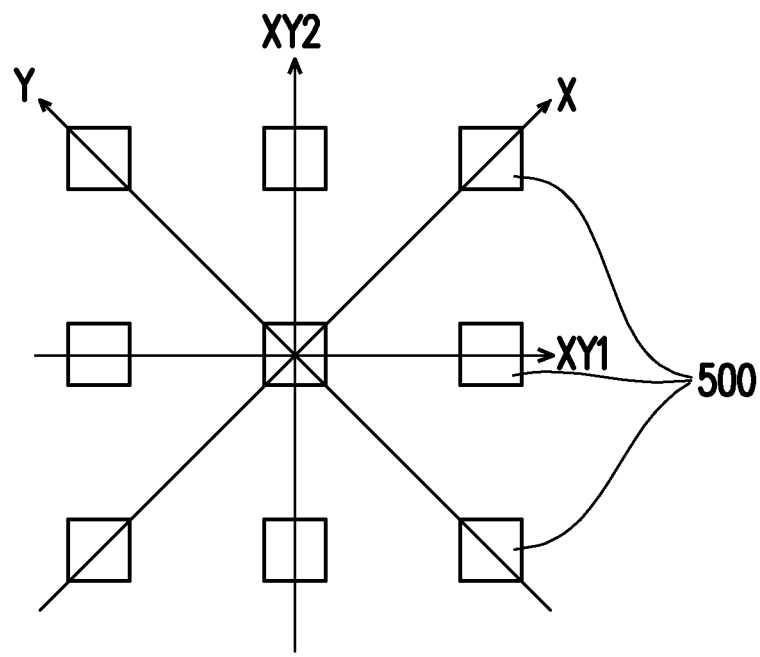
FIGS. 8A and 8B respectively illustrate schematic views of the movement directions and the imaging positions of the plane image of an embodiment of the invention.
Figure 8B:
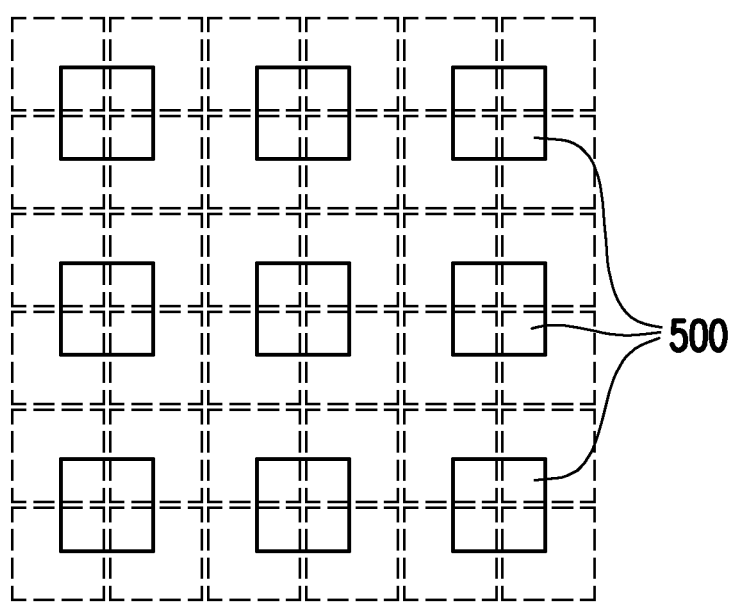

FIG. 8A illustrates a schematic view of the movement directions of the plane image of an embodiment of the invention. FIG. 8B illustrates a schematic view of imaging positions of the plane image of the embodiment of FIG. 8A. Referring to FIGS. 8A and 8B, the image displacement module switches the imaging positions of the plane image, such that the plane image 500 is moved by a distance along one of a plurality of movement directions. The positions of the plane image 500 are decided according to the rotation method of the carrier 1200. When the carrier 1200 rotates relative to one of the first axis 1610 and the second axis 1620, the positions of the plane image 500 are, for instance, on the screen 400 of FIG. 1 and moved by a distance along one of a plurality of movement directions, wherein the plurality of movement directions are, for instance, the first direction X or the second direction Y. In the present embodiment, the distance is about 0.7 pixel widths. Therefore, the plane image 500 can be oscillated to four different positions (dotted grids) from the original positions (solid grids). In other words, the image resolution can be increased to four times the original image resolution. In another embodiment, the plane image 500 can be moved along one of a plurality of movement directions such as the first direction X, the second direction Y, a third direction XY1, and a fourth direction XY2. More specifically, when the carrier 1200 rotates relative to the first axis 1610 and the second axis 1620 at the same time, the plane image 500 are, for instance, moved by a distance on the third direction XY1 or the fourth direction XY2, wherein the third direction XY1 and the fourth direction XY2 are between the first direction X and the second direction Y.

Figure 9A:
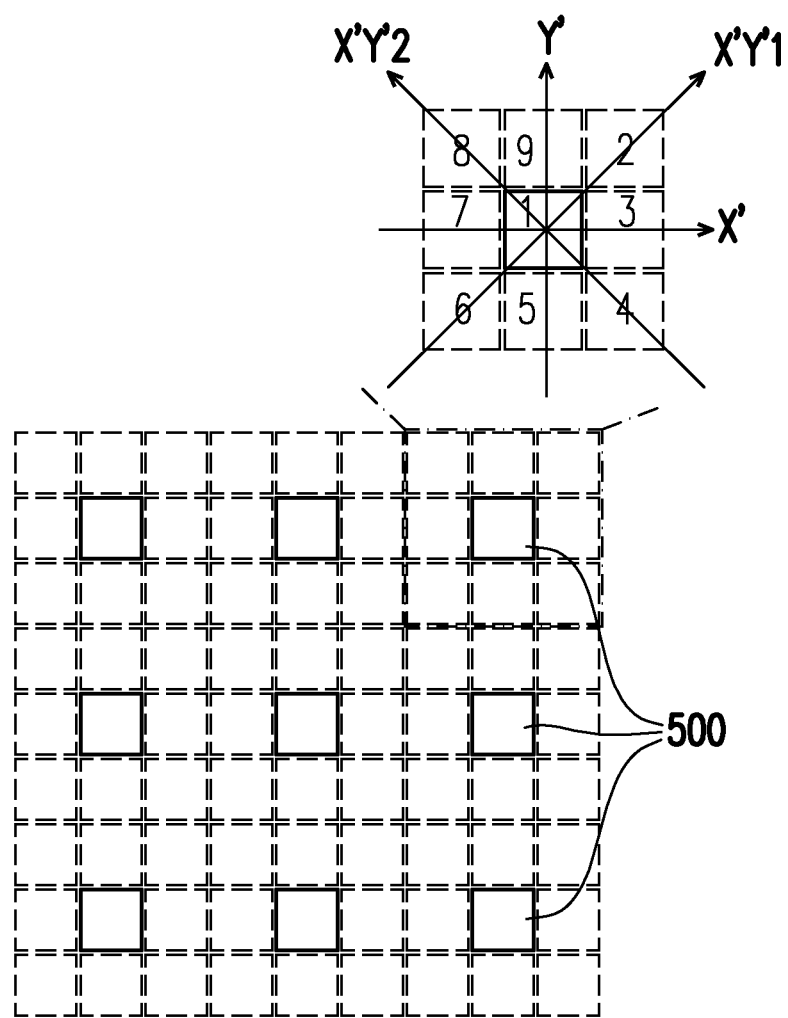
FIG. 9A illustrates a schematic view of the movement directions and the imaging positions of a plane image of another embodiment of the invention.
Figure 9B:
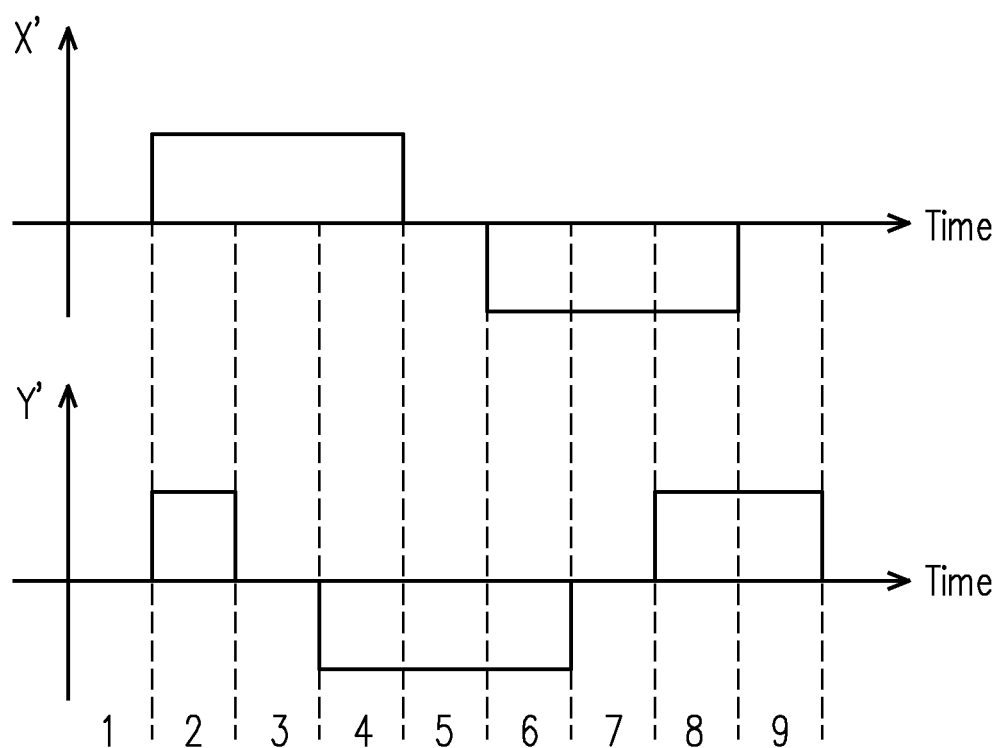
FIG. 9B illustrates a comparison schematic of the imaging positions of the plane image of the carrier of the embodiment of FIG. 9A rotating relative to different directions in a frame time.

FIG. 9A illustrates a schematic view of the movement directions and the imaging positions of plane image of another embodiment of the invention. FIG. 9B illustrates a comparison schematic of the imaging positions of the plane image of the embodiment of FIG. 9A rotating relative to different directions in a frame time. Referring to FIG. 9A, when the carrier rotates relative to at least one of the first axis and the second axis, the positions of the plane image 500 are displaced along the directions X', Y', X'Y'1, and X'Y'2. In the present embodiment, the distance moved by the plane image 500 on the direction X' and the direction Y' are both 1 pixel width, and the distance moved by the plane image 500 on the direction X'Y'1 or the direction X'Y'2 is about 1.4 pixel widths.

More specifically, in FIGS. 9A and 9B, the numeric labels 1 to 9 respectively represent the same plane image located at different positions at different times. The plane image is moved on a basis of nine fixed positions in the present embodiment, but the invention is not limited thereto. The numeric label 1 represents the position of the plane image without moving. The numeric labels 3 and 7 represent the positions of the plane image 500 moving to the right or to the left on the direction X'. The numeric labels 5 and 9 represent the positions of the plane image 500 moving up or moving down on the direction Y'. The numeric labels 2 and 6 represent the positions of the plane image 500 moving on the direction X'Y' 1. The numeric labels 4 and 8 represent the positions of the plane image 500 moving on the direction X'Y'2.

The numeric labels 1 to 9 in FIG. 9B represents that, within the time interval, the plane image 500 are on the positions corresponding to the numeric labels 1 to 9 of FIG. 9A. The vertical axis of FIG. 9B represents that the plane image 500 can be moved along different directions (direction X' and/or direction Y') within different time intervals. For instance, when the numeric label is 1, the vertical axis values thereof corresponding to the direction X' and the direction Y' are both 0, meaning the plane image 500 are not actuated in the direction X' and the direction Y'. When the numeric label is 2, the vertical axis values thereof corresponding to the direction X' and the direction Y' are both positive, meaning the plane image 500 are moved from position 1 toward the direction between the direction X' and the direction Y' to position 2, which is the direction X'Y'1. When the numeric label is 4, the vertical axis value thereof corresponding to the direction X' is positive, the vertical axis value thereof corresponding to the direction Y' is negative, meaning the plane image 500 are actuated from position 1 toward the direction composed of the vectors of the direction X' and the negative direction Y' to position 4, which is the opposite direction of the direction X'Y'. The other numeric labels are defined in the same manner and are not repeated herein. Moreover, the plane image 500 (solid grids) can be moved to nine different positions (dotted grids) in FIG. 9A. In other words, the image resolution can be increased to nine times the original image resolution.

Figure 10A:
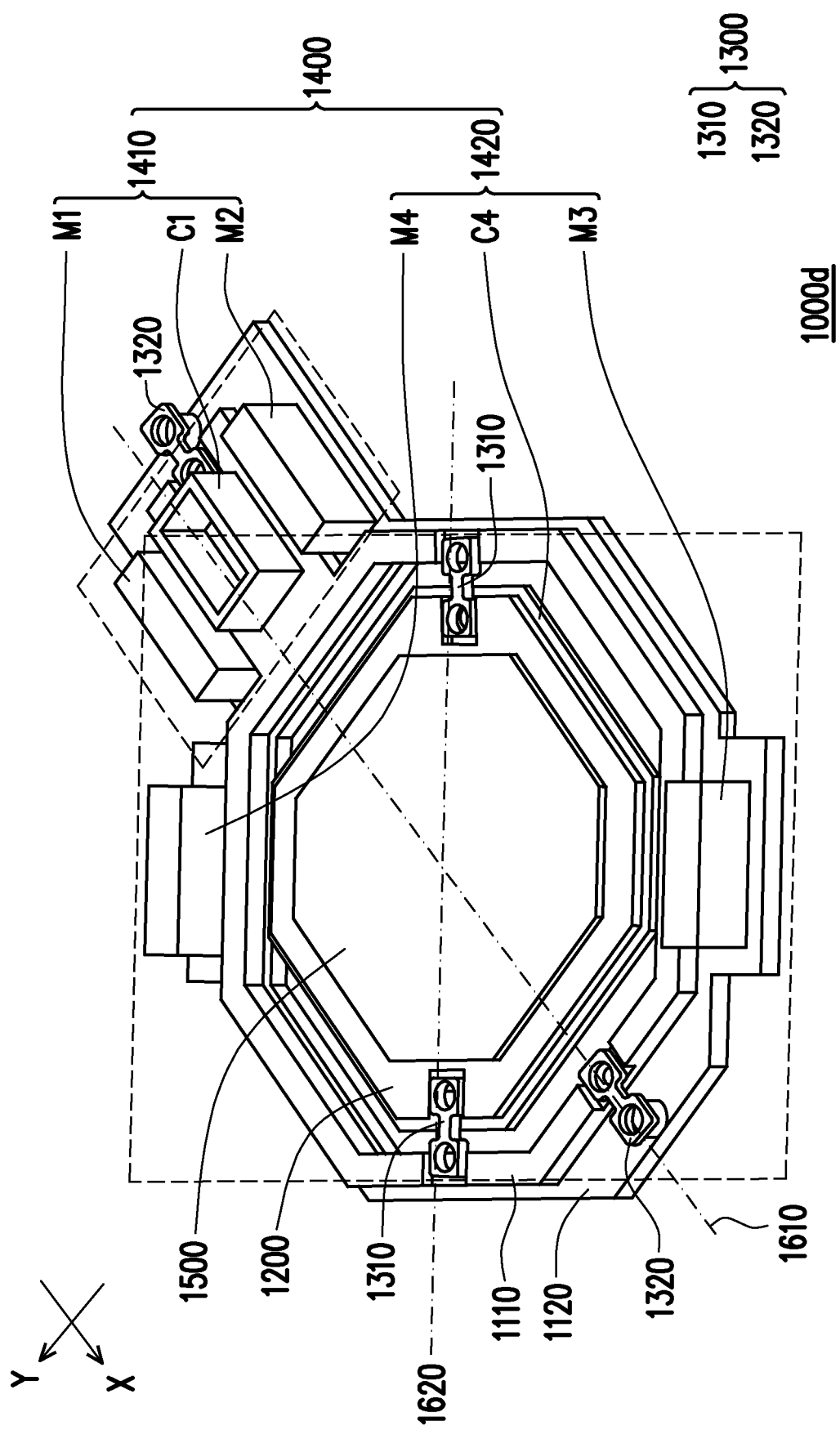
FIGS. 10A, 10B and 10C respectively illustrate stereoscopic structural schematics of image displacement modules of different embodiments of the invention.

FIG. 10A illustrates a stereoscopic structural schematic of an image displacement module of another embodiment of the invention. The main difference between an image displacement module 1000d and the image displacement module 1000b is: the angle between the first axis 1610 and the second axis 1620 is 45 degrees, in other words, the first axis 1610 and the second axis 1620 are not limited to be perpendicular to each other.

Figure 10B:
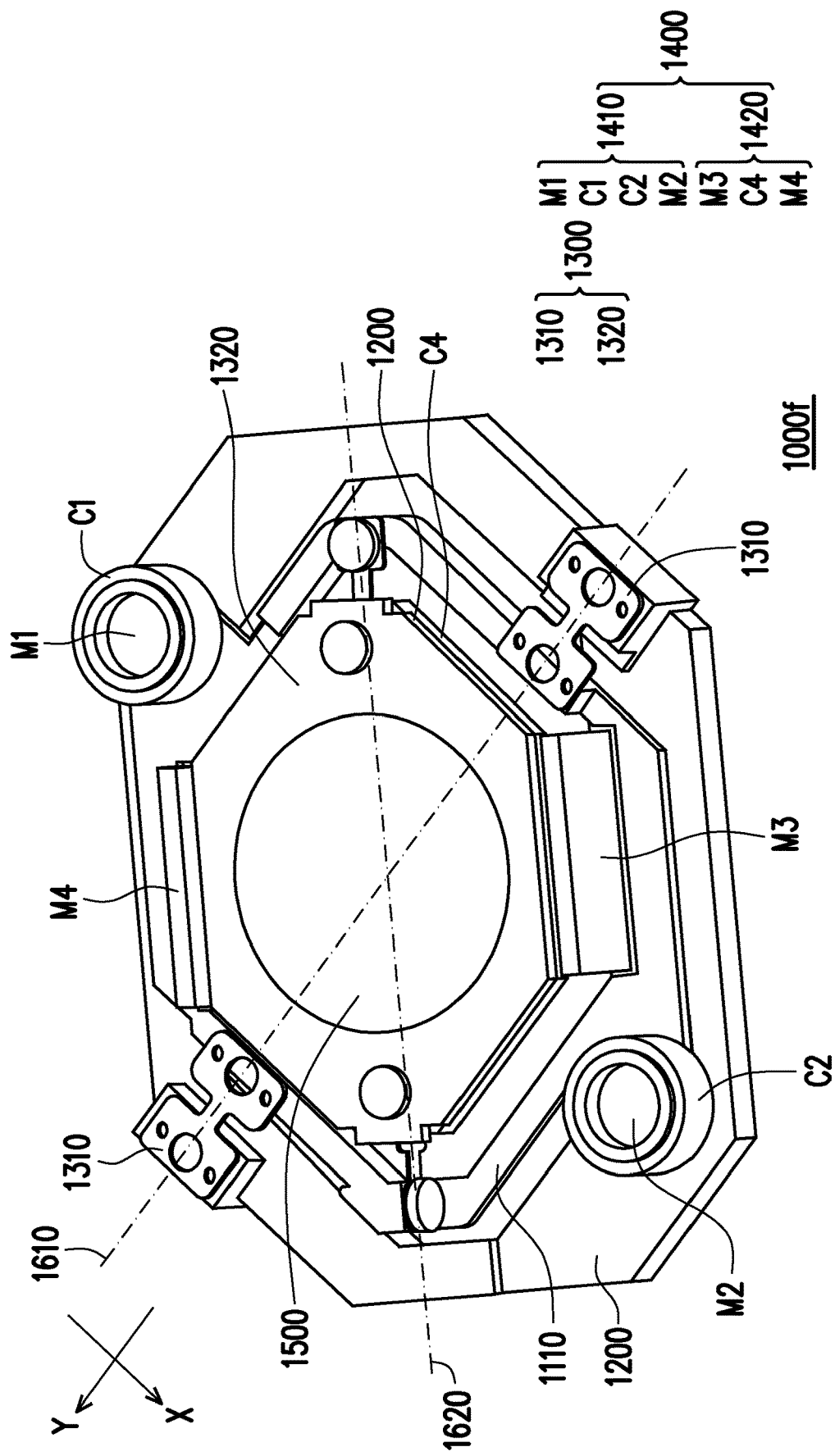

FIG. 10B illustrates a structural schematic of an image displacement module of another embodiment of the invention. The main difference between an image displacement module 1000f and the image displacement module 1000d is: the architectures of the elastic member 1300 and the actuators 1400 of the present embodiment. For instance, the first elastic pair 1310 are disposed at two opposite sides of the base 1120 along the first axis 1610, and the second elastic pair 1320, integratedly manufactured in one-piece, are disposed on the frame 1110 and connects the carrier 1200 along the second axis 1620. The angle is between the first axis 1610 and the second axis 1620 is 45 degrees. The first actuator 1410 includes two magnets M1 and M2 and two coils C1 and C2. M1 and M2 are located inside C1 and C2 respectively. The second actuator 1420 includes two magnets M3 and M4 and one coil C4, which surrounds the carrier 1200, like that illustrated in FIG. 6.

Figure 10C:
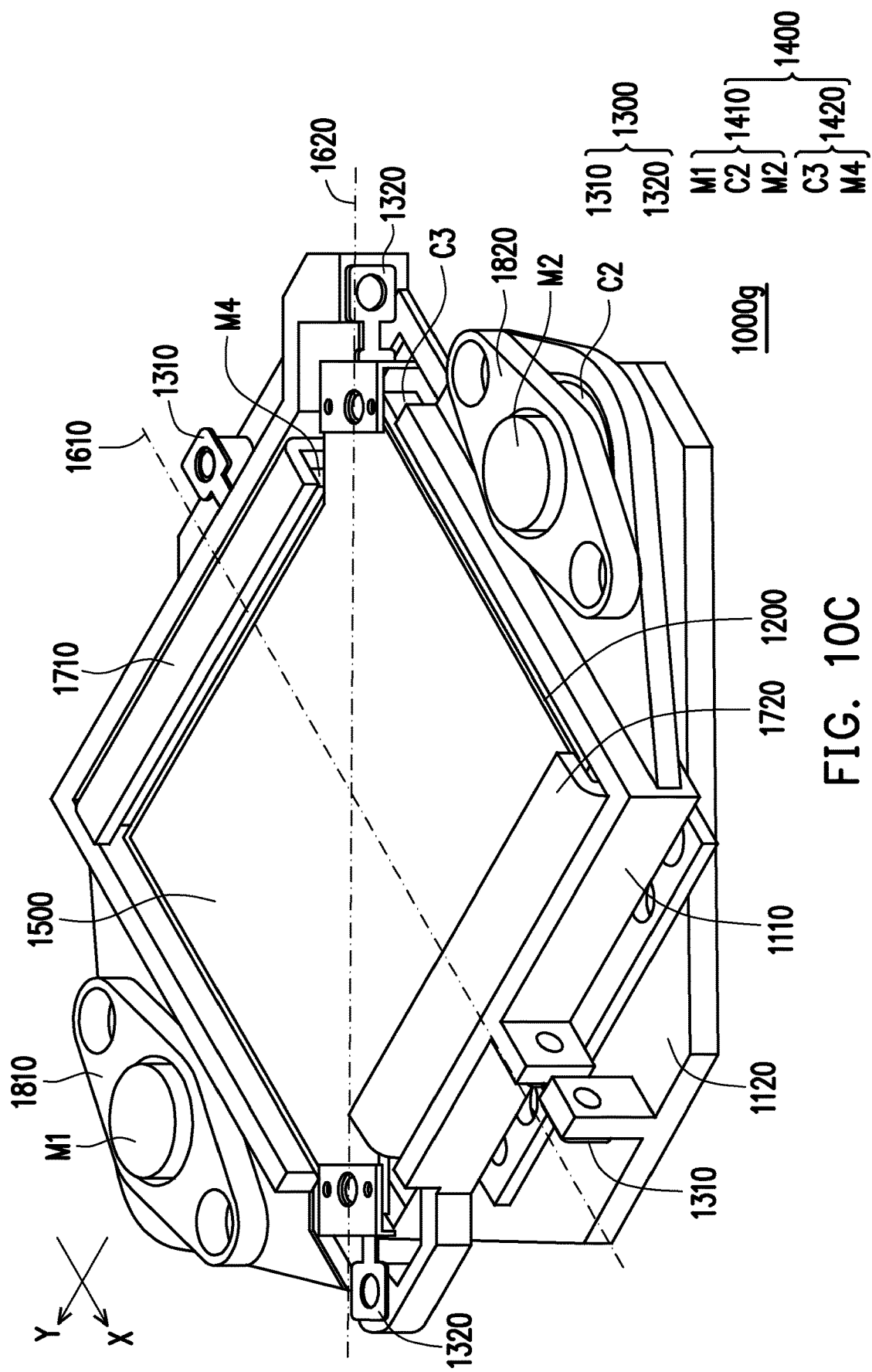

FIG. 10C illustrates a structural schematic of an image displacement module of another embodiment of the invention. The main difference between an image displacement module 1000g and the image displacement module 1000d is: the architectures of the elastic member 1300 and the actuators 1400 and the forms of the carrier 1200 and the optical element 1500. The forms of the carrier 1200 and the optical element 1500 are combined to be formed in one piece (Only 1500 is shown). In other words, the carrier 1200 could be removed and the optical element 1500 is directly connected to the frame 1710 by a connection part 1320. The first elastic pair 1310 is disposed at two opposite sides of the base 1120 along the first axis 1610, and connects the base 1120 and the frame 1110. The second elastic pair 1320 is disposed at two opposite sides of the carrier 1200 along the second axis 1620, and connects the frame 1110 and the carrier 1200. The first elastic pair 1310 and the second elastic pair 1320 are separately manufactured. The first actuator 1410 includes two magnets M1 and M2 and one coil C2. The second actuator 1420 includes two magnets M4 and one coil C3. C2 located on a surface of the bobbins 1820, 1810 facing to the carrier 1200. M1, M2 and C2 cooperate with the bobbins 1810, 1820 and drive the carrier 1200 to rotate relative to the first axis 1610. M4 located under the yoke 1710 and the yoke 1720 and C3 surrounds the carrier 1200. M4 and C3 drive the carrier 1200 to rotate relative to the second axis 1620.

Figure 11A:
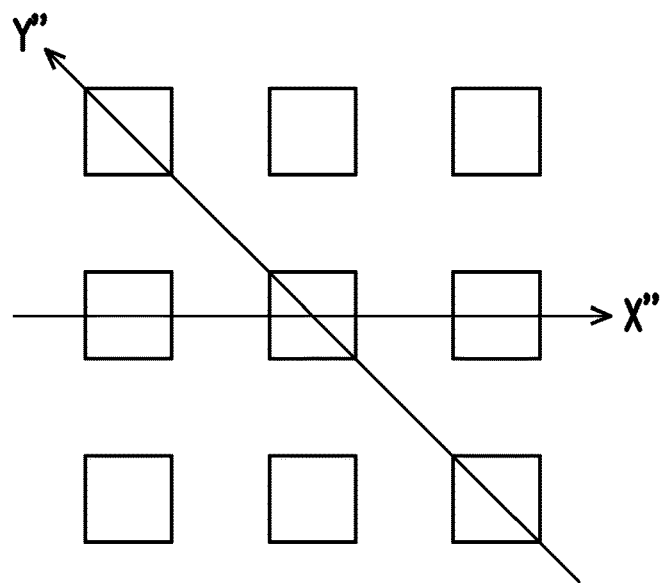
FIGS. 11A and 11B respectively illustrate schematic views of the movement directions and the imaging positions of the plane image of another embodiment of the invention.
Figure 11B:
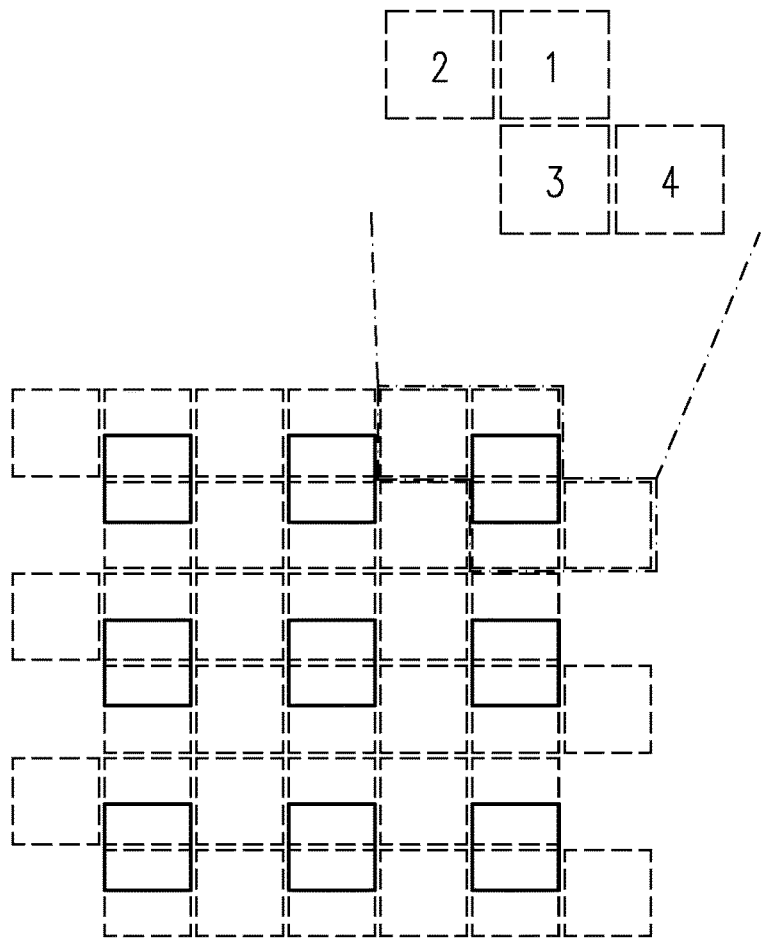

FIG. 11A illustrates a schematic view of the movement directions of plane image of another embodiment of the invention. FIG. 11B illustrates a schematic view of the imaging positions of the plane image of the embodiment of FIG. 11A. Referring to FIG. 11A, the distance is double the pixel width along the direction X", and is about 1.1 pixel widths along the direction Y". Therefore, the original positions (solid grids) of the plane image can be oscillated to four different positions (dotted grids). In other words, the image resolution can be increased to four times the original image resolution. The plane image are moved on a basis of four fixed positions in the present embodiment, but the invention is not limited thereto. The number of the fixed positions for movement reference is smaller than 10 in the embodiments of the present invention.

Figure 12A:
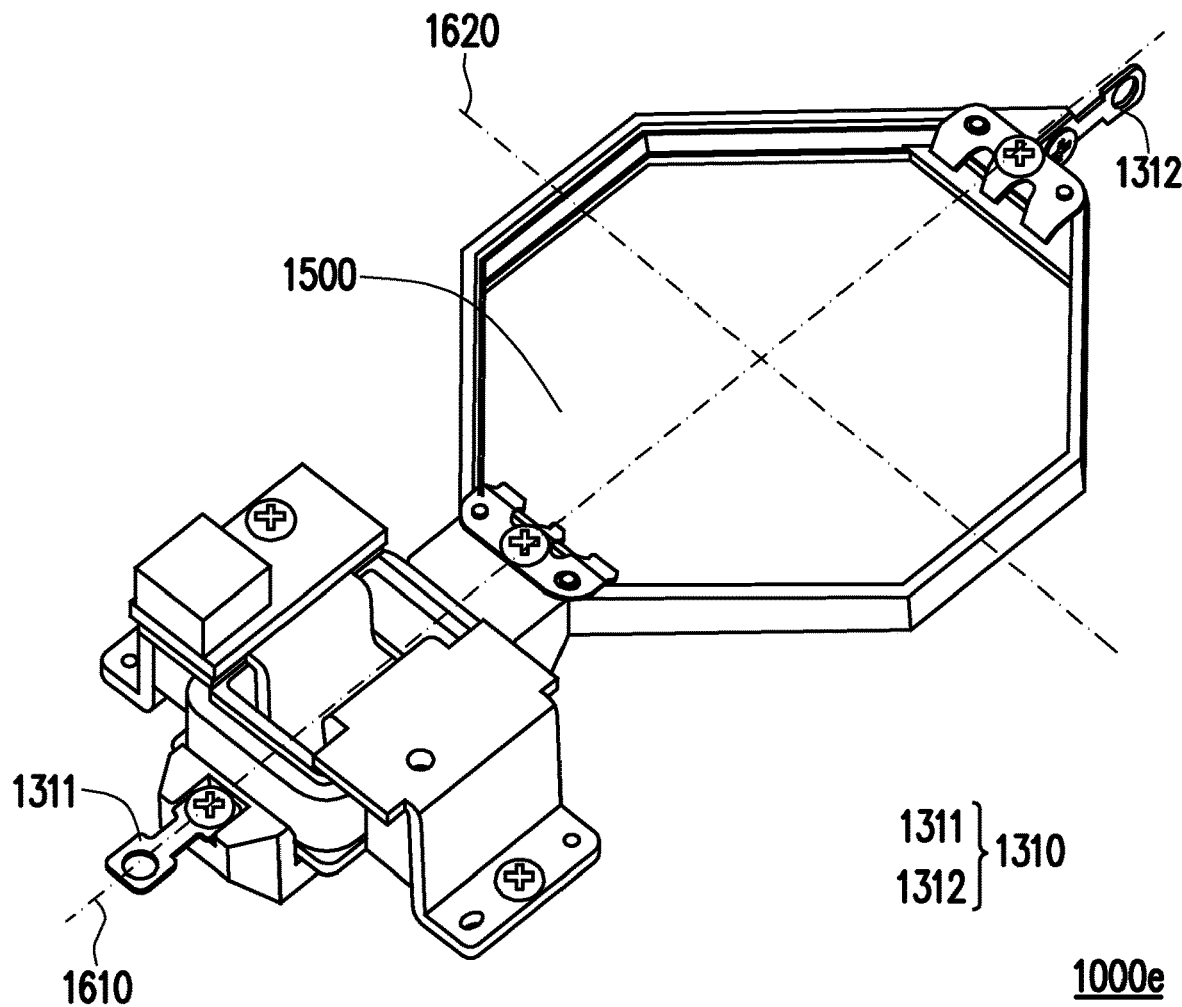
FIG. 12A illustrates a stereoscopic structural schematic of an image displacement module of an embodiment of the invention.
Figure 12B:
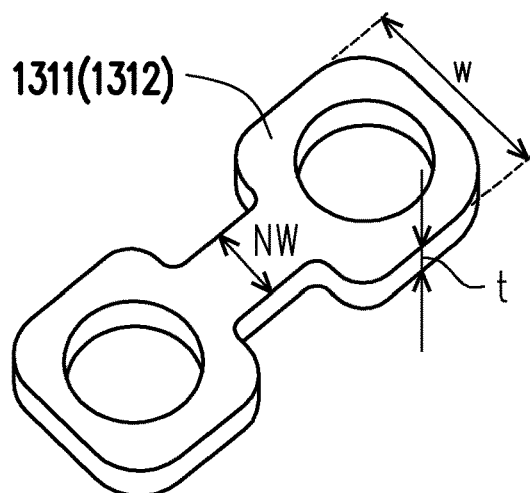
FIG. 12B illustrates a stereoscopic structural schematic of a elastic member of the embodiment of FIG. 12A.
Figure 12C:
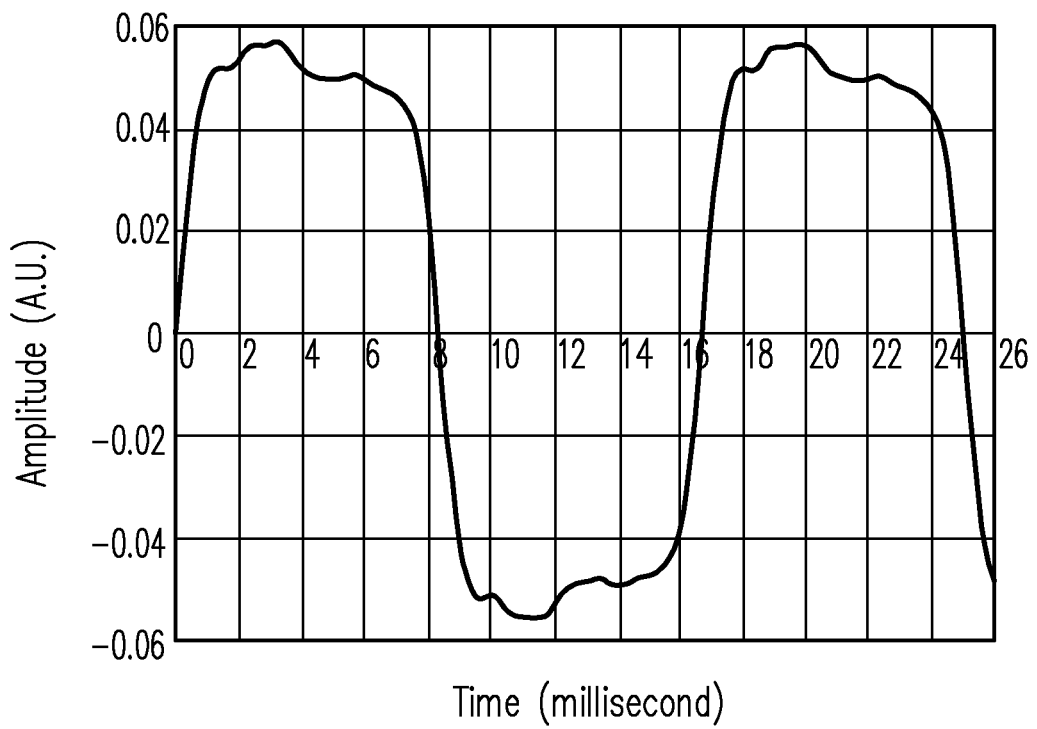
FIGS. 12C illustrates the relationship between amplitude and time of the elastic member of the embodiment of FIG. 12A.
Figure 12D:
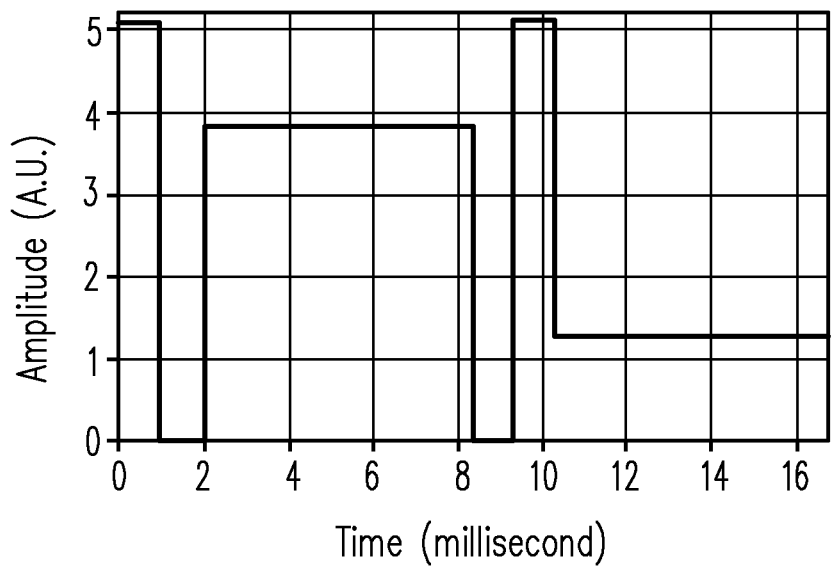
FIG. 12D illustrates the relationship between amplitude and time of the signal configured to drive the elastic member of the embodiment of FIG. 12A.

FIG. 12A illustrates a stereoscopic structural schematic of an image displacement module of an embodiment of the invention. FIG. 12B illustrates a stereoscopic structural schematic of an elastic member of FIG. 12A. FIG. 12C illustrates the relationship between amplitude and time of the elastic member of FIG. 12A. FIG. 12D illustrates the relationship between amplitude and time of the signal configured to drive the elastic member.

Referring to FIG. 12A, the elastic member pair 1310 includes a first elastic member 1311 and a second elastic member 1312. The first elastic member 1311 and the second elastic member 1312 are disposed perpendicular to each other along the first axis 1610 of an image displacement module 1000e, and such a disposition method allows the first axis 1610 to pass through the axis of the optical element 1500. In general, when the amplitude of the first elastic member 1311 is converted from one direction to another direction, the time needed for the amplitude conversion process is referred to as a transition time T. The length of the conversion time T decides the display quality of the plane image. Since the conversion time T and the natural frequency of the first elastic member 1311 are inversely proportional, the natural frequency and the structural parameters of the first elastic member 1311 are related. Therefore, the factors recited in the above affecting natural frequency can all be factors affecting the conversion time T.

Please refer to FIG. 12B. Based on the above, the conversion time T and the structural parameters of the first elastic member 1311 are related. In the present embodiment, the structural parameters of a neck width NW of the first elastic member 1311 are, for instance, 0.2 to 0.6 times those of a width w of the first elastic member 1311. Moreover, a thickness t of the first elastic member 1311 is also one factor affecting the conversion time T. In an embodiment, the thickness t of the first elastic member 1311 is at least 0.2 mm. The thickness design allows the natural frequency of the first elastic member 1311 to be at least greater than 90 Hz. Since the natural frequency and the conversion time T are inversely proportional, the thickness design can also effectively reduce the conversion time T.

In addition to the structural parameters of the first elastic member 1311 affecting the conversion time T, factors affecting the conversion time T further include the vibration method of the first elastic member 1311. Referring to FIGS. 12C and 12D at the same time, the conversion time T is reduced by changing the vibration method of the first elastic member 1311. Specifically, when the oscillation of the first elastic member 1311 is changed from one direction to another direction, the driving signal waveform thereof is as shown in FIG. 12D. Moreover, the driving signal waveform is not limited to the square wave driving signal shown in FIG. 12D, and can also be a sine wave driving signal waveform. The conversion time T is less than 1 millisecond, and is preferably between 1 millisecond and 0.05 milliseconds, such that the optical apparatus can provide good display quality.

Figure 13A:
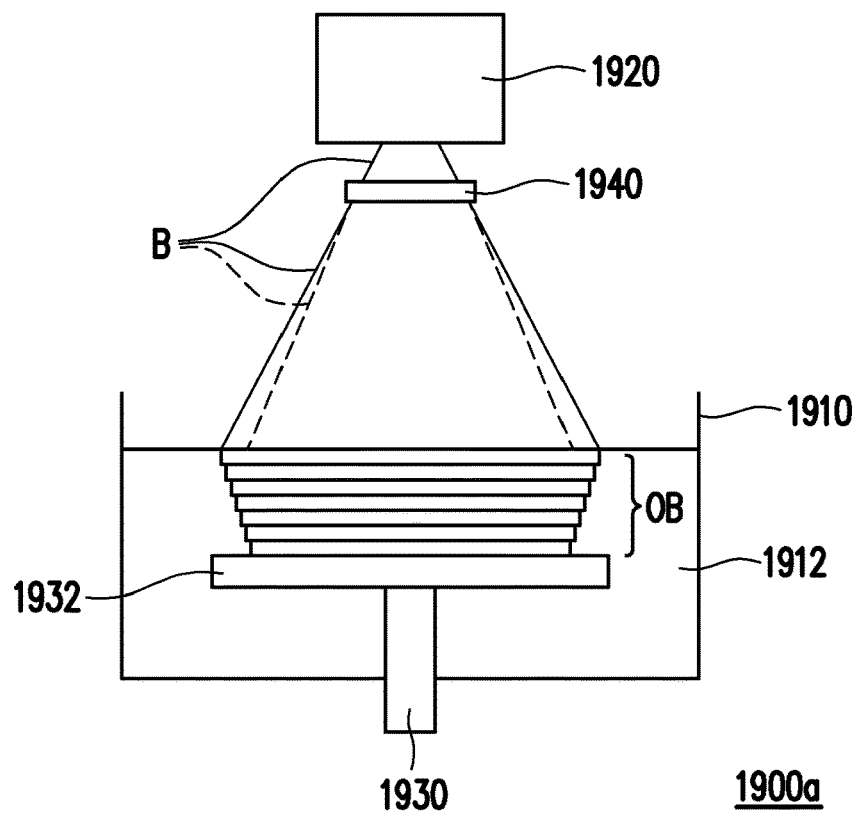
FIGS. 13A and 13B respectively illustrate schematics of different three-dimensional printing equipment adopting any one of the image displacement module of the above embodiments of the invention.
Figure 13B:
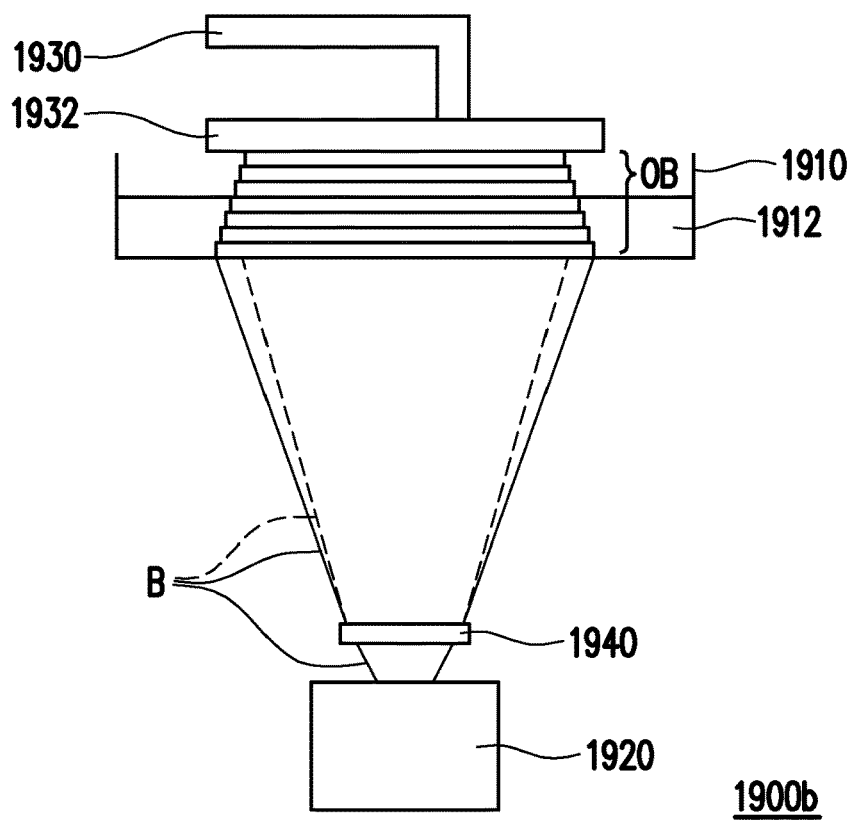

FIGS. 13A and 13B respectively illustrate schematics of different three-dimensional printing equipment adopting any one of the image displacement module of the above embodiments. Referring first to FIG. 13A, the three-dimensional printing technique adopted by a three-dimensional printing equipment 1900a, for instance, stereo lithography (SLA), and the three-dimensional printing equipment 1900a includes a tank 1910, a projection apparatus 1920, an lifting platform 1930, and an image displacement module 1940 mentioned in any one of the above embodiments, wherein the three-dimensional printing equipment 1900a is configured to form a three-dimensional printed object OB, wherein the three-dimensional printing equipment of FIG. 13A is, for instance, a sunken three-dimensional printing equipment 1900a.

The tank 1910 is configured to house a photosensitive material 1912, wherein when the photosensitive material 1912 is irradiated by a beam having a specific wavelength, a photopolymerization reaction occurs and the photosensitive material 1912 is cured. The projection apparatus 1920 has a light-emitting device, and the adopted light-emitting device can be a light-emitting diode (LED), a laser, or other suitable light-emitting devices, and the light-emitting device is adapted to emit a beam B, wherein the image beam B can provide light (such as UV) of a wave band capable of curing the photosensitive material 1912. However, the wave band of the image beam B is not limited thereto, and any wave band capable of curing the photosensitive material 1912 can be adopted. The lifting platform 1930 has a platform 1932. The platform 1932 receives the photosensitive material 1912 and works as a printing region, and might be adapted to move inside the molding tank 1910. The image displacement module 1940 is disposed on the outside of the projection apparatus 1920, and the image displacement module 1940 is disposed in the path of the image beam B. In other embodiments, the image displacement module 1940 can be disposed inside the projection apparatus 1920, as long as the image displacement module 1940 is disposed in the path of the image beam B, and the location at which the image displacement module 1940 is disposed is not limited thereto.

It can be seen from FIG. 13A that the print region 1932 is immersed in the photosensitive material 1912, the image beam B is irradiated on a portion of the photosensitive material 1912 via the scanning path of the first sliced layer, and a photopolymerization reaction occurs to this portion of the photosensitive material 1912 such that this portion of the photosensitive material 1912 is cured. As a result, one of the cross-sections of the three-dimensional printed object OB is generated, and therefore a first cured layer adhered on the print region 1932 is obtained. Then, the lifting platform 1930 is moved downward a short distance, and the originally formed first cured layer is correspondingly moved downward a short distance, and the upper surface of the originally formed first cured layer can be used as a carrying surface, such that another layer of the photosensitive material 1912 covers the first cured layer. Moreover, the image beam B is precisely controlled according to the scanning path of the second sliced layer, such that the image beam B is irradiated on the surface of the other layer of the photosensitive material 1912 via the scanning path of the second sliced layer, and a second cured layer is obtained as a result. After a plurality of layers is continuously manufactured in this manner, the three-dimensional printed object OB can be formed.

Referring to FIG. 13B, FIG. 13B illustrates a schematic of another three-dimensional printing equipment adopting the image displacement module in the above embodiments of the invention. Referring first to FIG. 13B, a three-dimensional printing equipment 1900*b* shown in FIG. 13B is similar to the three-dimensional printing equipment 1900*a* shown in FIG. 13A, and the main difference thereof is: the material of the molding tank 1910 includes a transparent material or a light-transmitting material, and the lifting platform 1930 and the projection apparatus 1920 are respectively disposed at two opposite sides of the molding tank 1910, wherein the three-dimensional printing equipment 1900*b* of FIG. 13B is, for instance, a pull-up type of three-dimensional printing equipment 1900*b*. Since the material of the molding tank 1910 includes a transparent material or a light-transmitting material, the image beam B can be irradiated on the photosensitive material 1912 through the molding tank 1910.

Referring to both FIG. 13A and FIG. 13B, since the image displacement module 1940 is disposed in the path of the image beam B, after the image beam B passes through the image displacement module 1940, the image beam B is projected to different locations at different times. Specifically, the solid lines illustrated in FIG. 13A and FIG. 13B are the locations of projection of the image beam B at a certain time; and the dashed lines illustrated in FIG. 13A and FIG. 13B are the locations of projection of the image beam B at another certain time. Therefore, since the three-dimensional printing equipment 1900*a* and 1900*b* of the present embodiments have the image displacement module 1940 mentioned in any of the above embodiments, such that higher resolution can be obtained when the three-dimensional printing equipment 1900*a* and 1900*b* cure the photosensitive material 1912. As a result, the three-dimensional printed object OB has better surface precision.

Based on the above, since in the optical apparatus of the embodiment, an image displacement module is disposed on the transmission path of a plane image, wherein the image displacement module controls a rotating base to rotate relative to two axes of a reference plane via a carrying base so as to decide any movement direction of the plane image on a two-dimensional plane, the resolution of the plane image in any direction can be increased via the image displacement module. The optical apparatus of the embodiment can adopt a reflective light valve having lower resolution to project an image having higher resolution.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A projector comprising:
a light source for generating an illumination light;
a light valve disposed in a transmission path of the illumination light and converting the illumination light into a multi-pixel area image light;
a projection lens disposed in a transmission path of the multi-pixel area image light; and
a displacement module comprising:
a carrier;
an optical element disposed at the carrier and being configured to receive the multi-pixel area image light;
a frame connected to the carrier with a first connection part in a first direction; and
a base connected to the frame with a second connection part in a second direction;
wherein the carrier, the frame and the base are substantially coplanar with each other, and the multi-pixel area image light provided is configured to be moved by the optical element and being moved along a third direction in response to the spinning of the carrier, and the first direction is different from the second direction.

2. The projector of claim 1, wherein the multi-pixel area image light is moved along n positions and the n is <10.

3. The projector of claim 1, wherein the carrier spins within 10 degrees around a first axis and spins within 10 degrees around a second axis.

4. The projector of claim 1, wherein the multi-pixel area image light is moved between the first direction and the second direction.

5. The projector of claim 1, wherein the first connection part and the second connection part are elastic plates.

6. The projector of claim 1, wherein the first connection part and the second connection part are single-process forming pieces.

7. The projector of claim 1, further comprising a first actuator and a second actuator, wherein the first actuator provides a first signal to control the spin of the first connection part and the second actuator provides a second signal to control the spin of the second connection part.

8. The projector of claim 7, wherein the first signal and the second signal go through different paths.

9. The projector of claim 7, wherein the first actuator comprises a first coil and a first magnetic part, and the second actuator comprises a second coil and a second magnetic part.

10. The projector of claim 1, wherein the optical element is a reflective optics.

11. The projector of claim 1, wherein the light valve is a digital micromirror device (DMD).

12. The projector of claim 1, wherein the carrier and the optical element are combined to be formed in one piece.

13. A three-dimensional printing apparatus, comprising:
a container containing a photosensitive material;
a platform for receiving the photosensitive material;
a projector for projecting a multi-pixel area image light on the platform, and the projector comprising:
a light source for generating an illumination light;
a light valve disposed in a transmission path of the illumination light and converting the illumination light into a multi-pixel area image light;
a projection lens disposed in a transmission path of the multi-pixel area image light; and
a displacement module comprising:
a carrier;
an optical element disposed at the carrier and being configured to receive the multi-pixel area image light;
a frame connected to the carrier with a first connection part in a first direction; and
a base connected to the frame with a second connection part in a second direction;

wherein the carrier, the frame and the base are substantially coplanar with each other, and the multi-pixel area image light provided is configured to be moved by the optical element and being moved along a third direction in response to the spinning of the carrier, and the first direction is different from the second direction.

14. The three-dimensional printing apparatus of claim 13, wherein the multi-pixel area image light is moved along n positions and the n is <10.

15. The three-dimensional printing apparatus of claim 13, wherein the carrier spins within 10 degrees around a first axis and spins within 10 degrees around a second axis.

16. The three-dimensional printing apparatus of claim 13, wherein the first connection part and the second connection part are elastic plates.

17. The three-dimensional printing apparatus of claim 13, further comprising a first actuator and a second actuator, wherein the first actuator provides a first signal to control the spin of the first connection part and the second actuator provides a second signal to control the spin of the second connection part.

18. The three-dimensional printing apparatus of claim 17, wherein the first signal and the second signal go through different paths.

19. The three-dimensional printing apparatus of claim 17, wherein the first actuator comprises a first coil and a first magnetic part, and the second actuator comprises a second coil and a second magnetic part.

20. The three-dimensional printing apparatus of claim 13, wherein the optical element is a reflective optics.

* * * * *